United States Patent [19]

Browning

[11] Patent Number: 4,811,604

[45] Date of Patent: Mar. 14, 1989

[54] ACCELEROMETERS

[75] Inventor: George W. Browning, Stevenage, United Kingdom

[73] Assignee: British Aerospace Public Limited Company, London, England

[21] Appl. No.: 865,391

[22] Filed: May 21, 1986

[51] Int. Cl.⁴ ............................................. G01P 15/12
[52] U.S. Cl. ..................................... 73/517 R; 73/526
[58] Field of Search .............. 73/526, 517 R, 516 R, 73/514, 517 B; 338/46, 2

[56] References Cited

U.S. PATENT DOCUMENTS 3,788,149 1/1974 Wilner .............................. 73/517 R
4,561,299 12/1985 Orlando et al. ................... 73/517 R Primary Examiner—John Chapman
Attorney, Agent, or Firm—Cushman, Darby & Cushman

[57] ABSTRACT

An accelerometer includes a flexible beam member, a support and mounting holes. An inertial mass is carried by the beam member and is spaced from the mounting holes. A spring allows the beam to pivotably move in a plane transverse to a first direction. The beam member is resiliently deformable in the first direction and permits relative motion between the inertial mass and the support in response to acceleration. The beam member is also able to move relative to the support in the transverse plane because of the action of the spring to recude the likelihood of damage caused by shock accelerations.

11 Claims, 1 Drawing Sheet

U.S. Patent
Mar. 14, 1989
4,811,604
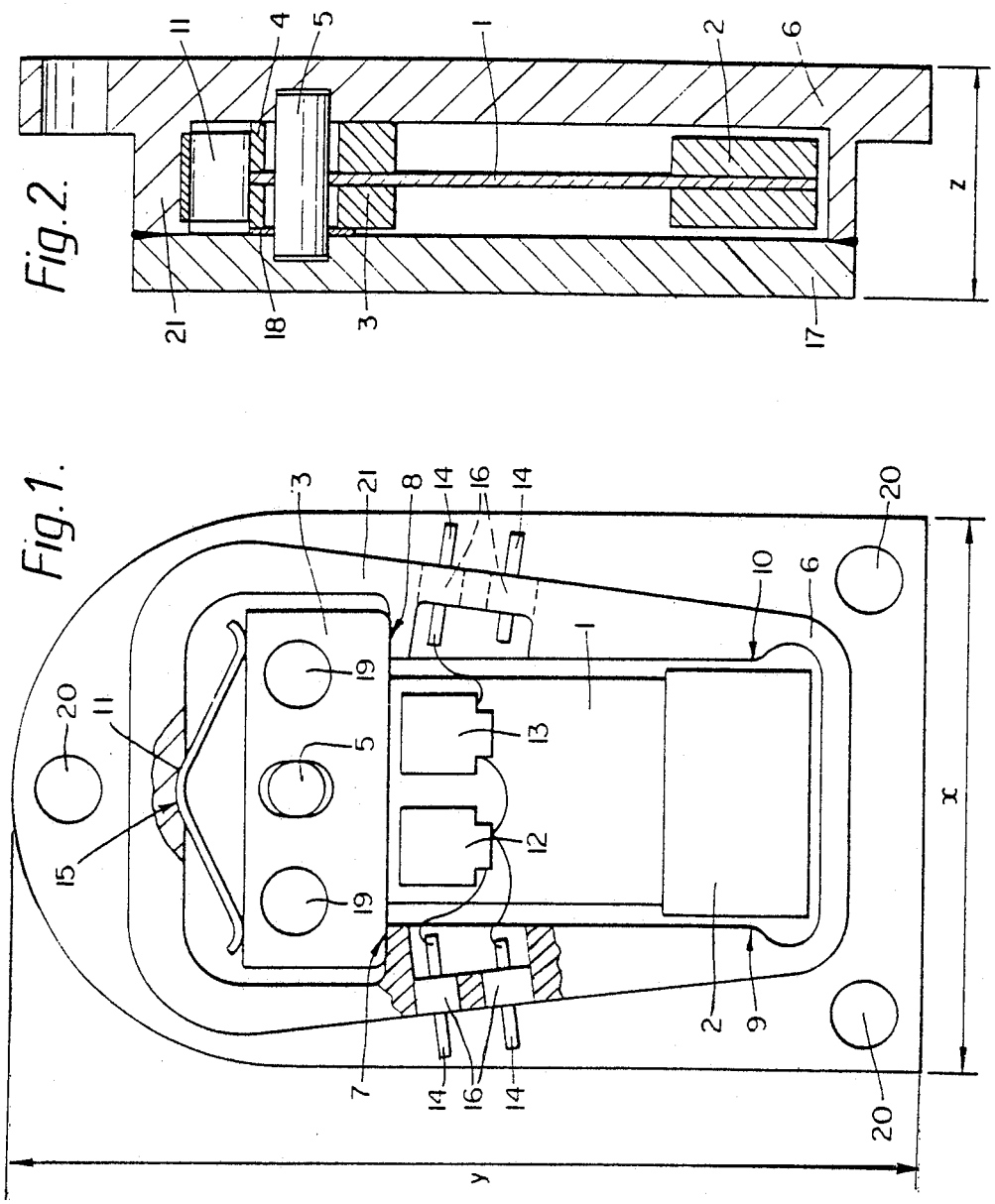

ACCELEROMETERS

This invention relates to accelerometers and is more particularly, but not exclusively, concerned with accelerometers capable of withstanding high levels of acceleration.

According to one aspect of the present invention, there is provided an accelerometer including a flexible beam, a support, mounting holes for mounting the beam with respect to the support, an inertial mass carried by the beam and spaced from the mounting holes, and a spring engaged between the mounting holes and the support, the beam being resiliently deformable in one direction to permit relative movement between the inertial mass and the support in response to acceleration experienced by the accelerometer in a first direction and the beam also being able to move bodily relative to the support in a plane transverse to the first direction against the action of the spring.

Advantageously, the support includes abutment members for engaging the beam and limiting the extent of the movement of the beam in the transverse plane.

According to a second aspect of the present invention, there is provided an accelerometer including a flexible beam which is supported by a support and which carries an inertial mass at a position spaced from the support, the beam being resiliently deformable in one direction to permit relative movement of the inertial mass and the support in response to acceleration of the accelerometer in the first direction, characterized in that with a view to lessening the likelihood of damage caused by shock accelerations in a direction transverse to the first direction, the beam as a whole is able to move relative to the support in a plane transverse to the first direction against the action of a spring engaged between the beam and the support.

For a better understanding of the invention, reference will now be made, by way of example, to the accompanying drawing in which:

FIG. 1 is a plan view of an accelerometer including a housing of which a cover part has been removed; and FIG. 2 is a sectioned side elevation of the accelerometer.

Referring to the figures, the accelerometer includes a housing having a base part 6 which has holes 20 therein for mounting the accelerometer and from which there extends an integral lateral wall 21 to define a shallow space for containing the sensitive element of the accelerometer. The space is closed by a cover part 17 which is sealed to the wall 21, for example by being electron beam welded thereto. The acceleration-sensitive element of the accelerometer has a small, metal, T-shaped beam 1, which carries an inertial mass at the end of its stem portion. This stem portion is wide and long compared with the thickness of the beam, thereby making it relatively rigid in the x- and y-directions shown but flexible in the z-direction. The cross-portion of the beam 1 is held between support members 3 and 4 and is mounted, with the support members, on a pivot pin 5, one end of which fits into a hole in the housing base section 6, and which extends through aligned, elongate holes formed in each of the members 3 and 4 and the cross-portion of the beam, and the other end of which fits into a hole in the cover part 17. The elongate holes in the members 3 and 4 and the cross-portion of the beam 1 allow a degree of relative movement between the beam and the housing. The lateral wall of the housing is shaped to define two ledges 7 and 8 which lie adjacent respective ends of the cross-portion of the beam 1 and also two abutments 9 and 10 adjacent respective sides of the end of the stem portion of the beam. The beam 1 and members 3 and 4 are urged against ledges 7 and 8 by the action of a V-shaped leaf spring 11 positioned between the cross-portion of the beam and the lateral wall of the housing and with the base of the V-shaped spring located in a small recess 15 in the lateral wall and its two ends in contact with the members 3 and 4 and the beam 1. Strain gauges 12 and 13 are attached to the beam 1 as shown, so that any bending of the beam in the z-direction due to acceleration of the accelerometer can be measured. The gauges 12 and 13 are connected to external measuring circuits (not shown) by way of feed-through pins 14 extending through the housing wall and sealed thereto by metal/glass seals 16. The housing is filled with oil to provide damping for any oscillations which may occur. A spring washer 18 is positioned on pin 5 between support member 3 and cover part 17 to take up any slack in the z-direction.

The accelerometer is operable to measure acceleration in the z-direction, such acceleration causing bending of the beam stem portion and producing a corresponding output signal from the strain gauges.

In use, the accelerometer is mounted on a structure with its z-dimension aligned with the direction along which the accelerometer is to measure acceleration and its x-dimension parallel to the axis of the mount. During a high acceleration of the structure, the mass 2 moves in the direction of the x-dimension. This causes the beam 1 and members 3 and 4 to pivot about that one of the ledges 7 and 8, which is forward of the other in the direction of motion. This pivoting movement is permitted by the elongate holes in the members 3 and 4 and the beam 1, through which the pivot pin 5 passes. If it pivots about the ledge 7, the mass 2 eventually comes into contact with the abutment 10. The abutment 10 thus limits the extent of the movement of the beam 1 and the whole is returned to its central position under the action of the spring 11 when the high acceleration phase is past. Similarly, the beam may pivot about ledge 8 and be limited in its movement by the abutment 9.

On return to its central position, the accelerometer becomes operable to measure acceleration along the z-dimension as described earlier. Of course there could be a plurality of accelerometers on a structure arranged for measuring acceleration in respective directions. By way of example, there could be a first pair of such accelerometers each arranged to measure acceleration in one plane and a second pair each arranged to measure acceleration in an orthogonal plane. Holes 19 may be formed in the members 3 and 4 to reduce the mass thereof.

I claim:

1. An accelerometer comprising:
   a flexible beam member,
   support means for supporting said beam member,
   mounting means for mounting the beam member with respect to the support means,
   an inertial mass carried by the beam member and spaced from the mounting means; and
   spring means engaged between the mounting means and the support means for biasing same apart so as to move in a plane transverse to one direction,
   the beam member being resiliently deformable in said one direction to permit relative movement between the inertial mass and the support means in response to acceleration experience by the accelerometer in said one direction and the beam member also being able to move bodily relative to the support means in said plane transverse to said one direction against the action of the spring means.

2. An accelerometer according to claim 1, wherein the support means includes abutment means for engaging the beam member and limiting the extent of bodily movement in said transverse plane.

3. An accelerometer according to claim 1, wherein the support means further includes locating pin means for both locating the mounting means and allowing bodily movement.

4. An accelerometer according to claim 1, wherein the flexible beam member is T-shaped and the mounting means comprises two block portions positioned one on each side of the cross-portion of the T-shape.

5. An accelerometer according to claim 4, wherein the support means is adapted to form two ledge portions, one on each side of the beam member, which engage with the mounting means and about which the beam member is able to pivot during bodily movement in said transverse plane.

6. An accelerometer according to claim 1, wherein the spring means is a V-shaped leaf spring, the base of which is located in a notch formed in the support means.

7. An accelerometer according to claim 1, wherein strain gauges are attached to the beam member for measuring the deformation in said one direction.

8. An accelerometer according to claim 1, wherein the support means is in the form of a sealed housing for the beam member.

9. An accelerometer according to claim 8, wherein the housing comprises a dished base portion and a cover portion.

10. An accelerometer according to claim 8, wherein the housing is filled with oil to damp any oscillator movement of the beam member.

11. An accelerometer comprising:
a flexible beam member,
support means for supporting said beam which carries an inertial mass at a position spaced from the support means,
the beam being resiliently deformable in one direction to permit relative movement of the inertial mass and the support means in response to acceleration of the accelerometer in said one direction, and further including, to reduce the likelihood of damage caused by shock accelerations in a plane transverse to said one direction, spring means engaged between the beam and support means for biasing same apart to allow the beam to move in said transverse plane so that the beam as a whole is able to move relative to the support means in said transverse plane against the action of said spring means.

* * * * *